United States Patent
Hansen

(10) Patent No.: US 9,837,843 B2
(45) Date of Patent: Dec. 5, 2017

(54) VOLTAGE GROUPING OF ENERGY STORAGE UNITS

(71) Applicant: General Electric Company, Schenectady, NY (US)

(72) Inventor: Lukas Mercer Hansen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 14/940,445

(22) Filed: Nov. 13, 2015

(65) Prior Publication Data
US 2017/0141596 A1 May 18, 2017

(51) Int. Cl.
| | | |
|---|---|---|
| *H02J 7/00* | (2006.01) | |
| *H02J 1/10* | (2006.01) | |
| *H02J 3/32* | (2006.01) | |
| *H02J 7/02* | (2016.01) | |

(52) U.S. Cl.
CPC ............. *H02J 7/0065* (2013.01); *H02J 1/10* (2013.01); *H02J 3/32* (2013.01); *H02J 7/007* (2013.01); *H02J 7/0019* (2013.01); *H02J 7/0026* (2013.01); *H02J 7/027* (2013.01); *H02J 2007/0096* (2013.01)

(58) Field of Classification Search
CPC .... H02J 7/0065; H02J 7/007; H01M 10/4207; H01M 10/482; H01M 10/425; H01M 2010/4271; H01M 2220/10
USPC ........................................................ 320/107
See application file for complete search history.

(56) References Cited

U.S. PATENT DOCUMENTS

| | | | |
|---|---|---|---|
| 6,021,052 A | 2/2000 | Unger et al. | |
| 8,237,407 B2* | 8/2012 | Hurst et al. | H01M 10/0481 320/128 |
| 9,450,274 B2* | 9/2016 | Vo et al. | H01M 10/4257 |
| 2011/0089693 A1 | 4/2011 | Nasiri | |
| 2012/0256568 A1 | 10/2012 | Lee | |
| 2013/0011704 A1 | 1/2013 | Horne et al. | |
| 2014/0002003 A1 | 1/2014 | Kim | |

(Continued)

FOREIGN PATENT DOCUMENTS

| | | |
|---|---|---|
| CN | 101895155 A | 11/2010 |
| EP | 1977495 A2 | 10/2008 |

(Continued)

OTHER PUBLICATIONS

Durathon DC System Technical Specifications—MWh Series, GE Energy Storage, 2014.

(Continued)

*Primary Examiner* — Sun Lin
(74) *Attorney, Agent, or Firm* — Dority & Manning, P.A.

(57) ABSTRACT

Systems and methods for controlling an energy storage system are provided. In one embodiment, an energy storage system can include a plurality of energy storage units and a plurality of buses. The energy storage system can further include a control system that can be configured to receive one or more signals indicative of a voltage associated with each energy storage unit of the plurality of energy storage units. The control system can be configured to send one or more command signal to selectively couple each energy storage unit to one of the plurality of buses based at least on the voltage associated with the energy storage unit.

20 Claims, 8 Drawing Sheets

(56) References Cited

U.S. PATENT DOCUMENTS

2014/0176147 A1    6/2014  Wiegman et al.
2014/0342193 A1   11/2014  Mull et al.
2015/0001943 A1    1/2015  Bartling et al.
2015/0280466 A1*  10/2015  Owen et al. .......... H02J 7/0013
                                                        320/107
2017/0141439 A1*   5/2017  Hansen ............. H01M 10/4207

FOREIGN PATENT DOCUMENTS

EP     2843789 A2    3/2015
WO    02095851 A1   11/2002

OTHER PUBLICATIONS

International Search Report and Written Opinion issued in connection with corresponding Application No. PCT/US2016/061220 dated Feb. 7, 2017.
International Search Report and Written Opinion issued in connection with related PCT Application No. PCT/US2016/060013 dated Feb. 22, 2017.

* cited by examiner

VOLTAGE GROUPING OF ENERGY STORAGE UNITS

FIELD OF THE INVENTION

The present subject matter relates generally to energy storage systems and more particularly, to energy storage systems that can selectively couple energy storage units to buses.

BACKGROUND OF THE INVENTION

Energy storage systems (e.g., battery energy storage systems) have become increasingly used to deliver power either as part of standalone energy storage systems or as part of power generation systems (e.g., a wind farm, solar farm, gas turbine system) with an integrated energy storage system. Energy storage systems are unique in that energy storage systems have the ability to both deliver and reserve energy for particular services. Energy storage systems can include one or more battery banks that can be coupled to the grid or other load via a suitable power converter.

Multiple batteries can be coupled to the same power converter via the same conversion bus. However, batteries that operate at a lower voltage (e.g., due to cell failure) can experience overvoltage as a result of being coupled to the same bus as higher voltage batteries. While individual power conversion for each battery can help reduce overvoltage, it can lead to significant cost.

BRIEF DESCRIPTION OF THE INVENTION

Aspects and advantages of the embodiments of the present disclosure will be set forth in part in the following description, or can be learned from the description, or can be learned through practice of the embodiments.

One example aspect of the present disclosure is directed to an energy storage system. The energy storage system includes a plurality of energy storage units and a plurality of buses. The energy storage system further includes a control system configured to receive one or more signals indicative of a voltage associated with each energy storage unit of the plurality of energy storage units. The control system can be configured to send one or more command signals to selectively couple each energy storage unit to one of the plurality of buses based at least on the voltage associated with the energy storage unit.

Another example aspect of the present disclosure is directed to a method of controlling an energy storage system. The energy storage system includes a plurality of energy storage units and a plurality of buses. The method includes receiving, by one or more control devices, one or more signals indicative of a voltage associated with each of the plurality of energy storage units. The method further includes detecting, by the one or more control devices, a change in the voltage of at least one of the plurality of energy storage units. The method includes sending, by the one or more control devices, one or more command signals to selectively coupling, by the one or more control devices, one or more of the plurality of energy storage units among the plurality of buses such that energy storage units associated with substantially similar voltage are coupled to the same bus.

Yet another example aspect of the present disclosure is directed to a control system for an energy storage system. The control system includes one or more processors and one or more memory devices. The one or more memory devices can store computer-readable instructions that when executed by the one or more processors cause the one or more processors to perform operations. The operations include receiving one or more signals indicative of a voltage associated with each of the plurality of energy storage units and detecting a change in the voltage of at least one of the plurality of energy storage units. The operations further include sending one or more command signals to selectively couple one or more of the plurality of energy storage units among the plurality of buses such that energy storage units associated with substantially similar voltage are coupled to the same bus.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
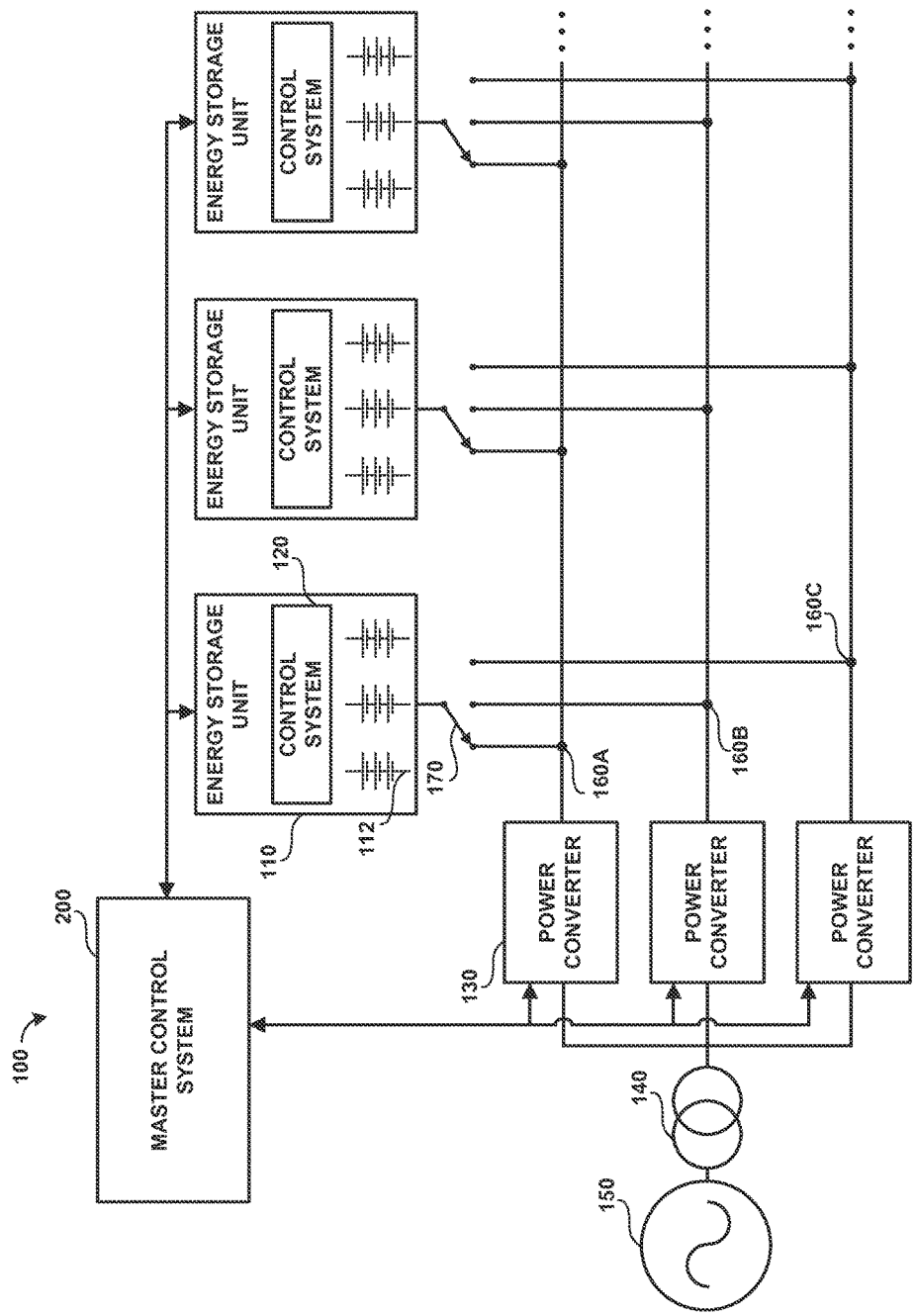
FIG. 1 depicts an energy storage system according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to selectively coupling energy storage units of an energy storage system to a plurality of buses to improve power conversion. More particularly, an energy storage system can include a plurality of energy storage units and a plurality of buses. Each energy storage unit can be associated with a voltage and each bus can be associated with a power converter. The energy storage system can include a master control system that can be configured to send one or more command signals to selectively couple each energy storage unit to one of the plurality of buses based at least on the voltage associated with the energy storage unit.

More particularly, the master control system can be configured to receive one or more signals from each energy storage unit (and/or an individual control systems associated therewith) indicative of a voltage associated with each of the energy storage units. Based at least on the voltage, the master control system can be configured to send one or more command signal to selectively couple and/or de-couple (e.g., via switches, contactors, or other elements) each energy storage unit to one or more buses. Moreover, the master control system can be configured to group each energy storage unit such that energy storage units of substantially similar voltages are included in a same group. The master control system can be configured to send one or more command signals to couple energy storage units within the same group to the same bus to balance the open circuit voltages among the energy storage units coupled in parallel.

The master control system can also, and/or alternatively, be configured to detect a change in a voltage associated with an energy storage unit. The change in the voltage can be, for instance, a reduction in voltage due to an energy storage cell failure. In response to the change in the voltage, the master control system can be configured to send one or more command signals to de-couple one or more energy storage units from a first bus and to couple the one or more energy storage units to a second bus. The second bus can be coupled to other energy storage units of substantially similar voltages.

Selectively coupling energy storage units to conversion buses according to example aspects of the present disclosure can improve power conversion without incurring the significant cost of individually converting power for each energy storage unit. Moreover, by selectively coupling energy storage units of substantially similar voltages to the same bus, the present disclosure can help balance the open circuit voltage among the energy storage units and reduce overvoltage.

With reference now to the Figures, example embodiments of the present disclosure will now be discussed in detail. FIG. 1 depicts an example energy storage system 100 according to example aspects of the present disclosure. The energy storage system 100 can be implemented in a stand-alone power system or can be implemented as part of a power generation energy system, such as a wind power generation system, solar power generation system, gas turbine power generation system, or other suitable system.

The energy storage system 100 can include a plurality of energy storage units 110, such as battery energy storage units. Each energy storage unit 110 can include one or more string 112. When an energy storage unit 110 includes more than one string 112, the strings 112 can be coupled in parallel. Additionally, and/or alternatively, the plurality of energy storage units can be coupled in parallel, connecting strings of different energy storage units in parallel. Each string 112 can include a plurality of cells coupled in series. The term cell can refer to any energy storage device, such as, for example, a battery cell, fuel cell, electrochemical cell, rechargeable cell, ultrabattery, SMES, accumulator, capacitor, pack, etc. The energy storage unit 110 can contain one or more sodium nickel chloride batteries, sodium sulfur batteries, lithium ion batteries, nickel metal hydride batteries, sodium metal halide batteries or other similar devices. Three energy storage units, each with three strings, are illustrated in FIG. 1 for purposes of illustration and discussion. Those of ordinary skill in the art, using the disclosures provided herein, will understand that any number of energy storage units and/or strings can be used in the energy storage system 100 within deviating from the scope of the present disclosure.

Each energy storage unit 110 can include a control system 120, such as a battery management system (BMS). The control systems 120 can include one or more electronic control devices that monitor the plurality of the string(s) 112, such as by protecting the string(s) 112 from operating outside a safe operating mode, monitoring a state of the cells, calculating and reporting operating data for the cells, controlling the cells environment, and/or any other suitable control actions. For example, in several embodiments, the control systems 120 are configured to monitor and/or control operation of the string(s) 112, as described in further detail herein. The control systems 120 can also be configured to send and/or receive one or more signals. For instance, each control system 120 can be configured to monitor a voltage associated with one or more string(s) 112 and/or energy storage unit 110 and to send one or more signals indicative of the voltage associated with the energy storage unit 110. The control systems 120 can be, for example, a logic controller implemented purely in hardware, a firmware-programmable digital signal processor, or a programmable processor-based software-controlled computer.

The energy storage system 100 can include a plurality of power converters 130. The power converters 130 can each be configured to convert a DC voltage associated with an energy storage unit 110 to suitable AC power for the AC grid (e.g. 50 Hz or 60 Hz power). In some embodiments, the power converters 130 can include a combination of DC to DC converters and DC to AC converters.

The power converters 130 can include one or more electronic switching elements, such as insulated gate bipolar transistors (IGBTs). The electronic switching elements can be controlled (e.g., using pulse width modulation) to charge or to discharge the energy storage units 110. In addition, the electronic switching elements can be controlled to convert the DC power received or provided to the energy storage units 110 to suitable AC power for application to utility grid 150 (e.g., 50 Hz or 60 Hz AC power). The power converters 120 can provide AC power to the grid 150 through a suitable transformer 140 and various other devices, such as switches, relays, contactors, etc. used for protection of the energy storage system 100.

The energy storage system 100 can include a plurality of buses 160. Each bus 160 can be associated with an individual power converter 130. Each energy storage unit 110 can be coupled to a bus 160. For instance, the energy storage system 100 can include a one or more switches 170. The one or more switches 170 can be configured to couple and/or de-couple one or more energy storage units 110 to one or more buses 160, as further described herein. The number of buses, power converters, and switches are illustrated in FIG. 1 for purposes of illustration and discussion. Those of ordinary skill in the art, using the disclosures provided herein, will understand that any number of these components can be used in the energy storage system 100 without deviating from the scope of the present disclosure.

Figure 2:
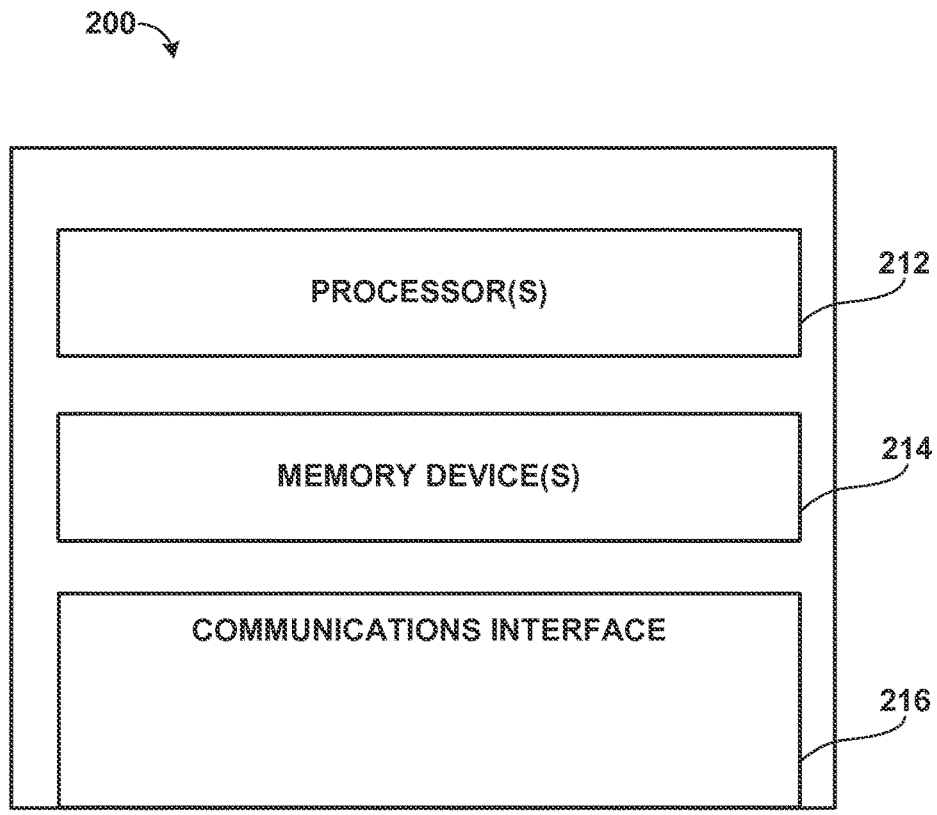
FIG. 2 depicts a control system according to example embodiments of the present disclosure.

The energy storage system 100 can include a master control system 200 that is configured to monitor and/or control various aspects of the energy storage system 100 as shown in FIGS. 1 and 2. In accordance with various embodiments, the master control system 200 can include one or more control devices or separate units or can be part of the control systems 120 of the energy storage units 110.

As shown, the master control system 200 can be in communication with the energy storage units 110, control systems 120, power converters 130, buses 160, and/or switches 170. The master control system 200 can be configured to send and/or receive one or more signals to and/or from the energy storage units 110, control systems 120, power converters 130, buses 160, and/or switches 170. For instance, the control systems 120 and/or energy storage units 110 can be configured to send one or more signals indicative of the voltage associated with the energy storage unit 110 to the master control system 200. The master control system 200 can be configured to receive the one or more signals from the energy storage units 110 and/or the control systems 120 indicative of a voltage (e.g., an open circuit voltage) associated with each of the energy storage units 110.

The master control system 200 can be configured to send one or more command signals to each energy storage unit 110 and/or control system 120. For instance, the master control system 200 can be configured to send one or more command signals to each energy storage unit 110 and/or control system 120 to selectively couple and/or de-couple each energy storage unit 110 to one or more of the plurality of buses 160 based at least in part on the voltage associated with the energy storage unit 110. The master control system 200 can send one or more command signals to the energy storage 110 and/or control system 120 to couple the energy storage unit 110 to a bus 160A, 160B, 160C. The energy storage unit 110 and/or control system 120 can receive the one or more command signals and can adjust the switch 170 to couple the energy storage unit 110 to a bus 160A, 160B, 160C. For instance, the control system 120 can be configured to adjust the switch 170 to an open position (e.g., that does not allow current to flow from the energy storage unit 110 through the bus 160) and/or a closed position (e.g., that allows current to flow from the energy storage unit 110 through the bus 160) with respect to each of bus 160A, 160B, 160C. By way of example, to de-couple the energy storage unit 110 from the bus 160A, the control system 120 can adjust the switch 170 to be in an open position with respect to bus 160A. To couple the energy storage unit 110 to bus 160B, the control system 120 can adjust the switch 170 to be in a closed position with respect to bus 160B.

Additionally and/or alternatively, the master control system 200 can be configured to group each energy storage unit 110 based at least on the voltage associated with each energy storage unit 110. For instance, the master control system 200 can be configured to group each energy storage unit 110 such that energy storage units associated with substantially similar voltages are included in a same group (e.g., similar open circuit voltage groups). In some embodiments, the number of groups can be equal to the number of power converters. The master control system 200 can be configured to send one or more command signals to the energy storage units 110 to couple the energy storage units within the same group to the same bus 160. The control system 120 may adjust the switch 170, according to the one or more command signals, such that an energy storage unit 110 is coupled to the same bus as other energy storage units in the group. The energy storage units 110 may be assigned to different groups over time as the energy storage units 110 degrade at different rates or if one or more energy storage units 110 are added to and/or replaced in the energy storage system 100.

The master control system 200 can be configured to detect a change in a voltage of the energy storage unit 110. For instance, the master control system 200 can be configured to detect a change in the voltage based on one or more signals received from the energy storage units 110 and/or the control systems 120. In response to the change in voltage, the master control system 200 can be configured to send one or more command signal to de-couple one or more energy storage unit 110 from a first bus 160A (e.g., by adjusting the switch 170 from a closed position to an open position with respect to bus 160A) and to couple the one or more energy storage units 110 to a second bus 160B (e.g., by adjusting the switch 170 from an open position to a closed position with respect to bus 160B). The second bus 160B can be coupled to other energy storage units associated with substantially similar voltages. In this way, the master control system 200 can help prevent overvoltage conditions.

Referring particularly to FIG. 2, the master control system 200 can have any number of suitable control devices. The master control system 200 can include a system level controller for the energy storage system 100 and/or a controller of one or more individual energy storage unit 110 or control system 120. As shown, for example, the master control system 200 (and/or control system 120) can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure. For instance, the instructions when executed by the processor(s) 212 can cause the processor(s) 212 to implement one or more control interfaces.

Additionally, the master control system 200 can include a communications interface 216 to facilitate communications between the master control system 200 and the various components of the energy storage system 100. For example, the communications interface can permit the transmission of signals to and/or from energy storage units 110, control systems 120, power converters 130, buses 160, and/or switches 170. The signals can be communicated using any suitable communications protocol. As such, the processor(s) 212 can be configured to receive and/or send one or more signals from the energy storage units 110, control systems 120, power converters 130, buses 160, and/or switches 170.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, and/or alternatively, the memory device(s) 214 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the master control system 200 to perform the various functions as described herein.

Figure 3:
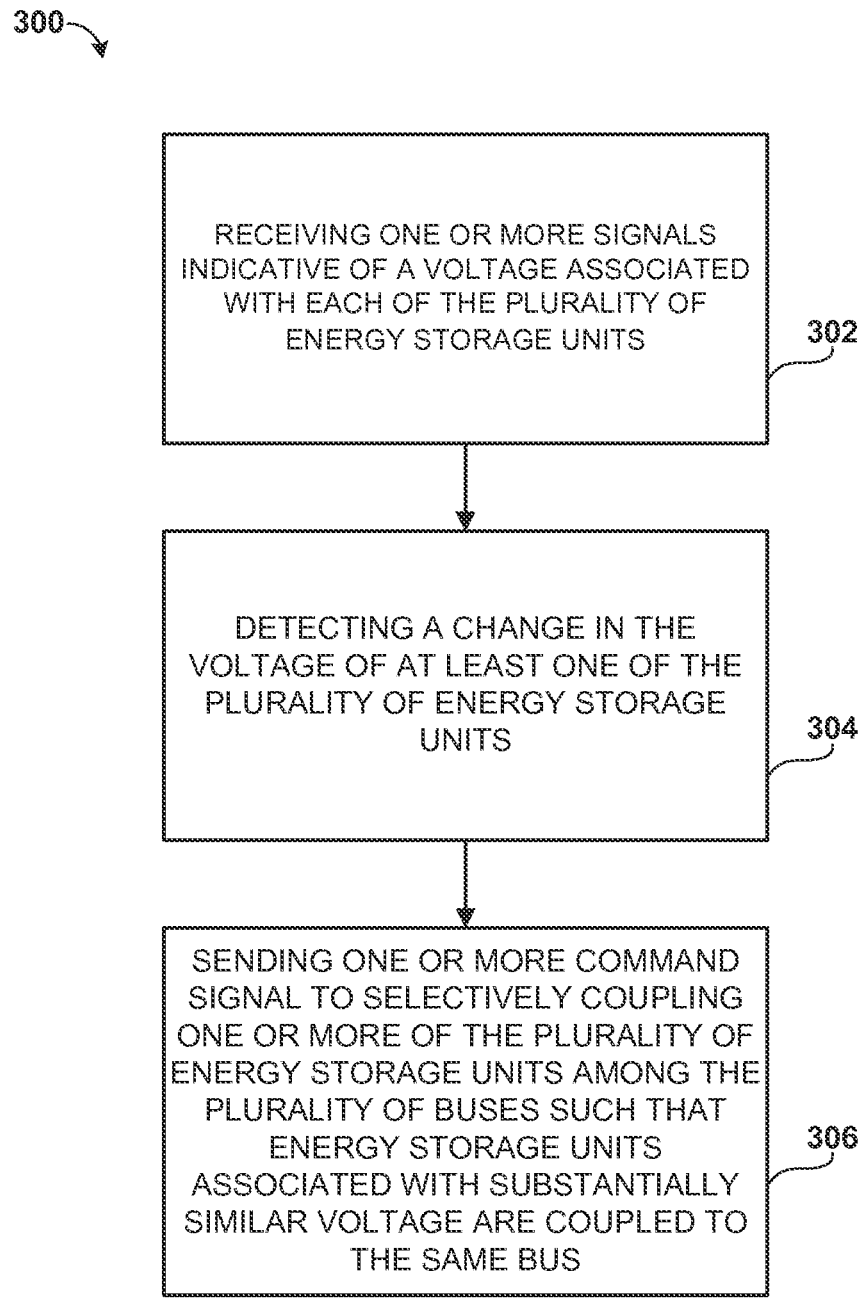
FIG. 3 depicts a flow diagram of an example method according to example embodiments of the present disclosure.

FIG. 3 depicts a flow diagram of an example method 300 for controlling an energy storage system according to example embodiments of the present disclosure. The method can be implemented in any suitable energy storage system, such as the energy storage system 100 of FIG. 1. In addition, FIG. 3 depicts steps performed in a particular order for purposes of illustration and discussion. Those of ordinary skill in the art, using the disclosures provided herein, will understand that various steps of any of the methods disclosed herein can be omitted, rearranged, modified, expanded, or adapted in various ways without deviating from the scope of the present disclosure.

At (302), the method includes receiving one or more signals indicative of a voltage associated with each of the plurality of energy storage units 110. For instance, the control systems 120 can monitor a voltage associated with the energy storage units 110 and/or string(s) 112. The control systems 120 and/or energy storage units 110 can send one or more signals indicative of the voltage associated with an energy storage unit 110 to the master control system 200. The master control system 200 can receive one or more signals, for instance, from the each energy storage unit 110 and/or control system 120, indicative of a voltage (e.g., open circuit voltage) associated with each of the energy storage units 110.

At (304), the method includes detecting a change in the voltage of at least one of the plurality of energy storage units 110. For instance, the master control system 200 can detect a change in the voltage. The change in the voltage can be a reduction in voltage (e.g., open circuit voltage) due to a cell failure. In example embodiments, the master control system 200 can detect the change in the voltage based on the one or more signals received by the master control system 200. In addition, and/or in the alternative, the master control system 200 can monitor a voltage associated with each energy storage unit 110 and detect a change in voltage based on such monitoring.

At (306), the method includes sending one or more command signal to selectively couple one or more of the plurality of energy storage units 110 among the plurality of buses 160 such that energy storage units 110 associated with substantially similar voltage are coupled to the same bus 160. The master control system 200 can send one or more command signal to the energy storage units 110 and/or control systems 120 to selectively couple each energy storage unit 110 to a bus 160 by, for instance, closing a switch 170. Each energy storage unit 110 can be coupled to a bus 160 such that energy storage units associated with substantially similar voltages are coupled to the same bus.

As one example, the method 300 can include grouping each energy storage unit 110 based at least on the voltage associated with each energy storage unit 110, such that energy storage units associated with substantially similar voltages are included in a same group. The method 300 can include sending one or more command signal to couple the energy storage units 110 within the same group to the same bus. The master control system 200 can group each energy storage unit 110 such that energy storage units associated with substantially similar voltages can be included in the same group. Moreover, the master control system 200 can send one or more command signals to the energy storage units 110 and/or control systems 120 to couple (e.g., via the switches, contactors, or other elements) the energy storage units 110 within the same group to the same bus. In this way, the master control system 200 can help prevent overvoltage.

As another example, the method 300 can include sending one or more command signals to de-couple one or more energy storage units 110 from a first bus 160A and sending one or more command signals to couple the one or more energy storage units 110 to a second bus 160B of the plurality of buses in response to the change in the voltage. The master control system 200 can send one or more command signals (e.g., to the energy storage units 110 and/or control systems 120) to de-couple one or more energy storage units 110 from a first bus 160A. For instance, the energy storage units 110 and/or control systems 120 can de-couple the energy storage units 110 from a first bus 160A by adjusting the switch 170 from a closed position to an open position with respect to the first bus 160A.

The master control system 200 can send one or more command signals (e.g., to the energy storage units 110 and/or control systems 120) to couple the energy storage unit 110 to a second bus 160B in response to the change in the voltage. For instance, based on the change in voltage (e.g., a reduction in voltage) the master control system 200 can select a second bus 160B that can be coupled to one or more energy storage units associated with substantially similar voltages as the energy storage unit 110 associated with the change in voltage. The energy storage unit 110 and/or control system 120 can couple the energy storage unit 110 to the second bus 160B by adjusting the switch 170 from an open position to a closed position with respect to second bus 160B. In this way, the master control system 200 can help prevent overvoltage of an energy storage unit 110 that experiences a change in voltage (e.g., reduction in voltage).

FIGS. 4-7 depict an example energy storage unit 110 according to example aspects of the present disclosure. The energy storage unit 110 can include one or more strings 112A, 112B and a control system 120 (e.g., a battery management system). In the event that the energy storage unit has more than one string, the strings 112A, 112B can be coupled in parallel. Each string 112A, 112B can include a plurality of cells 113, 114 coupled in series. In FIGS. 4-7 and/or the embodiments described herein, the strings 112A and 112B can be associated with the same energy storage unit 110 and/or difference energy storage units 110. Additionally, and/or alternatively, as shown in FIGS. 4-7 and described herein, the control system 120 can include one or more control devices of an energy storage unit 110 and/or one or more control devices of different energy storage units 110.

Each string 112A, 112B can be associated with a selectively adjustable tap location to control the number of cells 113, 114 in the string that provide power to a power system. While each cell 113, 114 can be configured to provide power to a power system, the control system 120 can control which of the cells 113, 114 do, in fact, provide power to the power system by adjusting the tap location. For instance, each cell 113, 114 can be associated with a tap 115, 116 (e.g., switch, transistor, contactor, etc.) configured to prevent and/or allow the cells 113, 114 (and all cells previously in series) to provide power to a power system. The tap location can be a location at which a tap is closed, thereby allowing cells to provide power through a tap.

Figure 4:
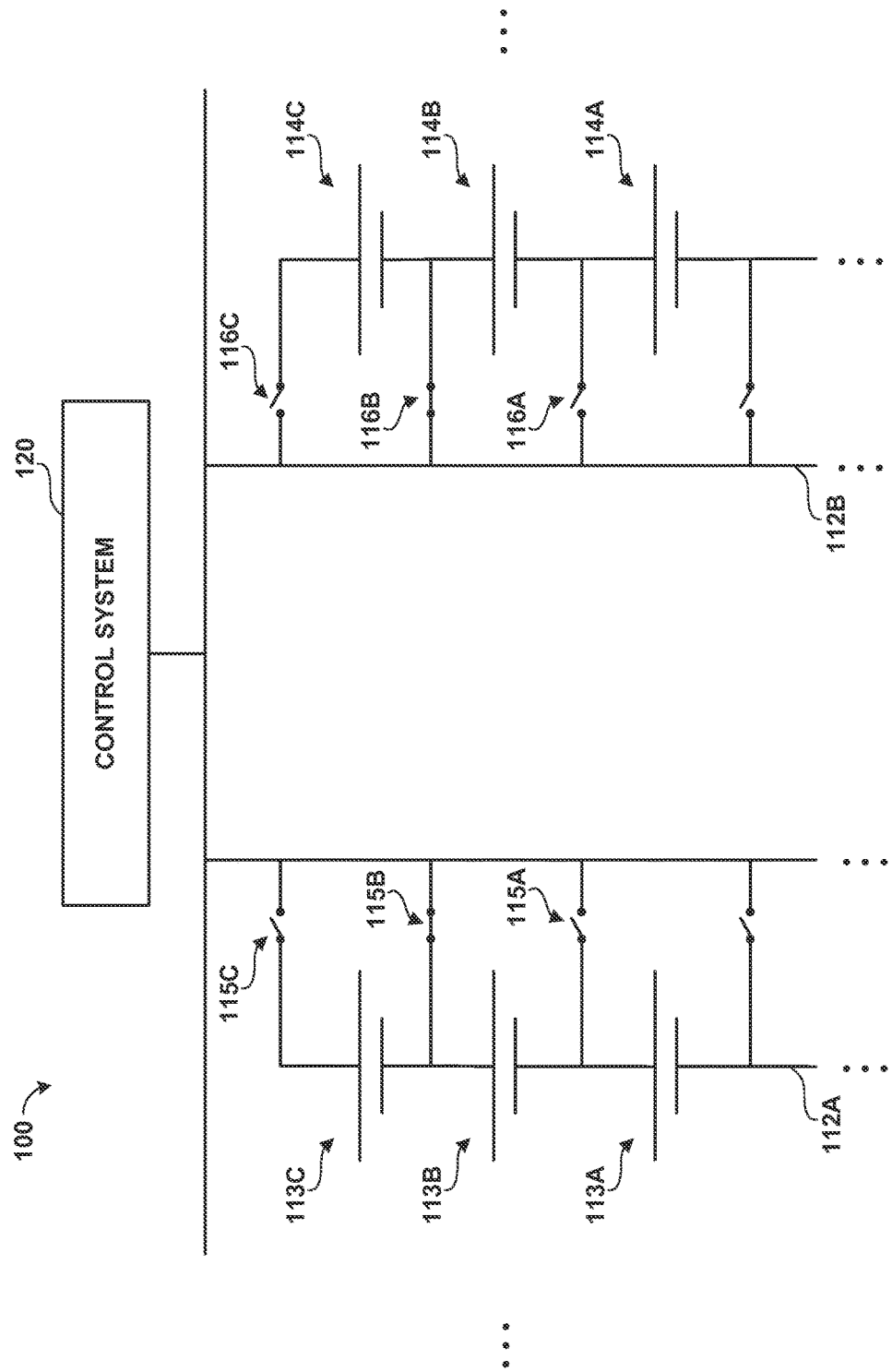
FIG. 4 depicts an energy storage unit according to example embodiments of the present disclosure.

By way of example, as shown in FIG. 4, tap 115B is closed and can allow cells 113A and 113B (and any cells coupled in series below 113A) to provide power to a power system, through tap 115B. Tap 115C is open and can prevent cell 113C from providing power to a power system. The tap location can be associated with the location of tap 115B through which the cells 113A, 113B (and any cells coupled in series below 113A) can provide power to a power system. In this way, the cells 113A, 113B can be included in the number of cells that provide power to a power system, while cell 113C can be excluded from the number of cells that provide power to a power system.

The control system 120 can be configured to be in communication with each of the string(s) 112 and the taps 115, 116. The control system 120 can be configured to monitor a voltage associated with each of the string(s) 112A, 112B and to detect a change in a voltage associated with one or more of the string(s) 112A, 112B. The change in the voltage can be a reduction in voltage associated with a cell failure. The control system 120 can be configured to adjust the tap location for at least one of the string(s) 112A, 112B in response to the change in the voltage.

In one example, one or more energy storage units 110 can include a first string 112A comprising a first plurality of cells 113A, 113B, 113C coupled in series and a second string 112B comprising a second plurality of cells 114A, 114B, 114C coupled in series. The first string 112A and the second string 112B can be coupled in parallel. If a first cell 113B of the first string 112A fails (e.g., fails short) there can be a change in the voltage (e.g., a reduction in the voltage) associated with the first string 112A. The control system 120 can detect the change in the voltage and can be configured to adjust the tap location for at least one of the string(s) 112A, 112B to balance the open circuit voltage.

For instance, when the change in the voltage is a voltage reduction associated with the first string 112A, the control system 120 can be configured to adjust the tap location associated with the first string 112A to increase the number of cells 113 of the first string 112A that provide power through the tap location. The control system 120 can adjust the tap location associated with the first string 112A by adjusting a first tap 115B from a closed position (e.g., FIG. 4) to an open position (e.g., FIG. 5) and adjusting a second tap 115C from an open position (e.g., FIG. 4) and to a closed position (e.g., FIG. 5). Such adjustment can allow cell 113C to provide power through the tap location (e.g., at the closed second tap 115C of FIG. 5). In this way, the voltage associated with the first string 112A can be increased such that it can be substantially similar to the voltage associated with the first string 112A prior to the cell failure. Moreover, by adjusting the tap location associated with the first string 112A, the control system 120 can balance the open circuit voltage among the plurality of strings such that the open circuit voltages among the plurality of strings are substantially similar (e.g., within 20% of each other). For instance, the voltage of the first string 112A can be substantially similar to the voltage of the second string 112B. Such balancing can help avoid overvoltage of the first string 112A.

Additionally and/or alternatively, when the first string 112A experiences a change in voltage (e.g., reduction in voltage), the control system 120 can be configured to reduce the voltage associated with the second string 112B. For instance, the control system 120 can adjust the tap location associated with the second string 112B to decrease the number of cells 114 of the second string 112B that provide power through the tap location. The control system 120 can adjust the tap location associated with the second string 112B by adjusting a first tap 116B from a closed position (e.g., FIG. 6) to an open position (e.g., FIG. 7) and adjusting a second tap 116A from an open position (e.g., FIG. 6) to a closed position (e.g., FIG. 7). Such adjustment can prevent the cell 114B from providing power through the tap location (e.g., at the closed second tap 116A) and can reduce the voltage associated with the second string 112B. The voltage associated with the second string 112B can be reduced such that it is substantially similar to the voltage associated with the first string 112A after the cell failure. Additionally, and/or alternatively, the control system 120 can adjust a tap location associated with each string (other than the first string 112A) of the plurality of strings in a similar manner to reduce the voltage associated with each string. In this way, the control system 120 can balance the open circuit voltages among the plurality of strings such that the open circuit voltages among the plurality of strings are substantially similar.

Figure 7:
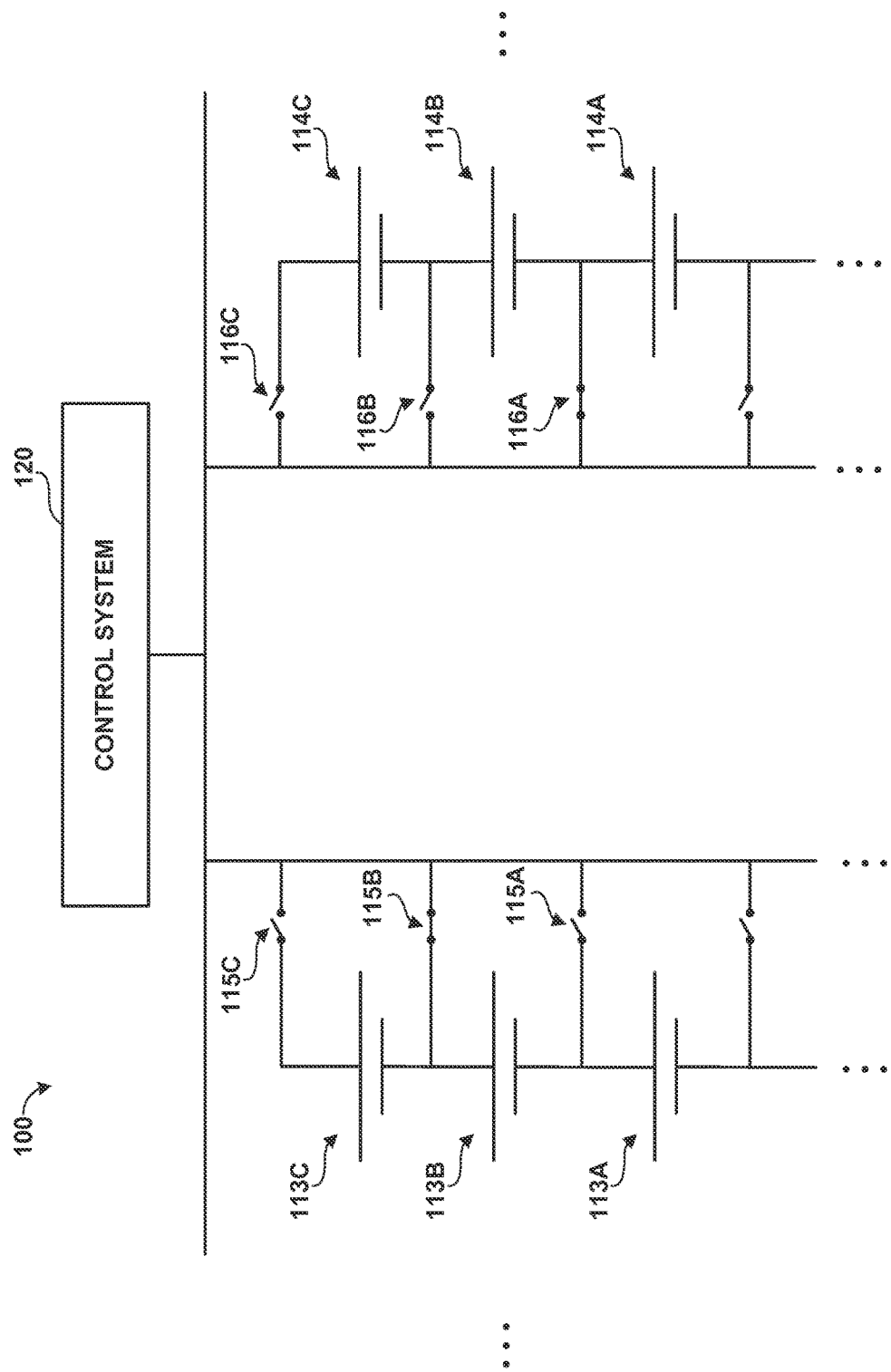
FIG. 7 depicts an energy storage unit according to example embodiments of the present disclosure.
Figure 8:
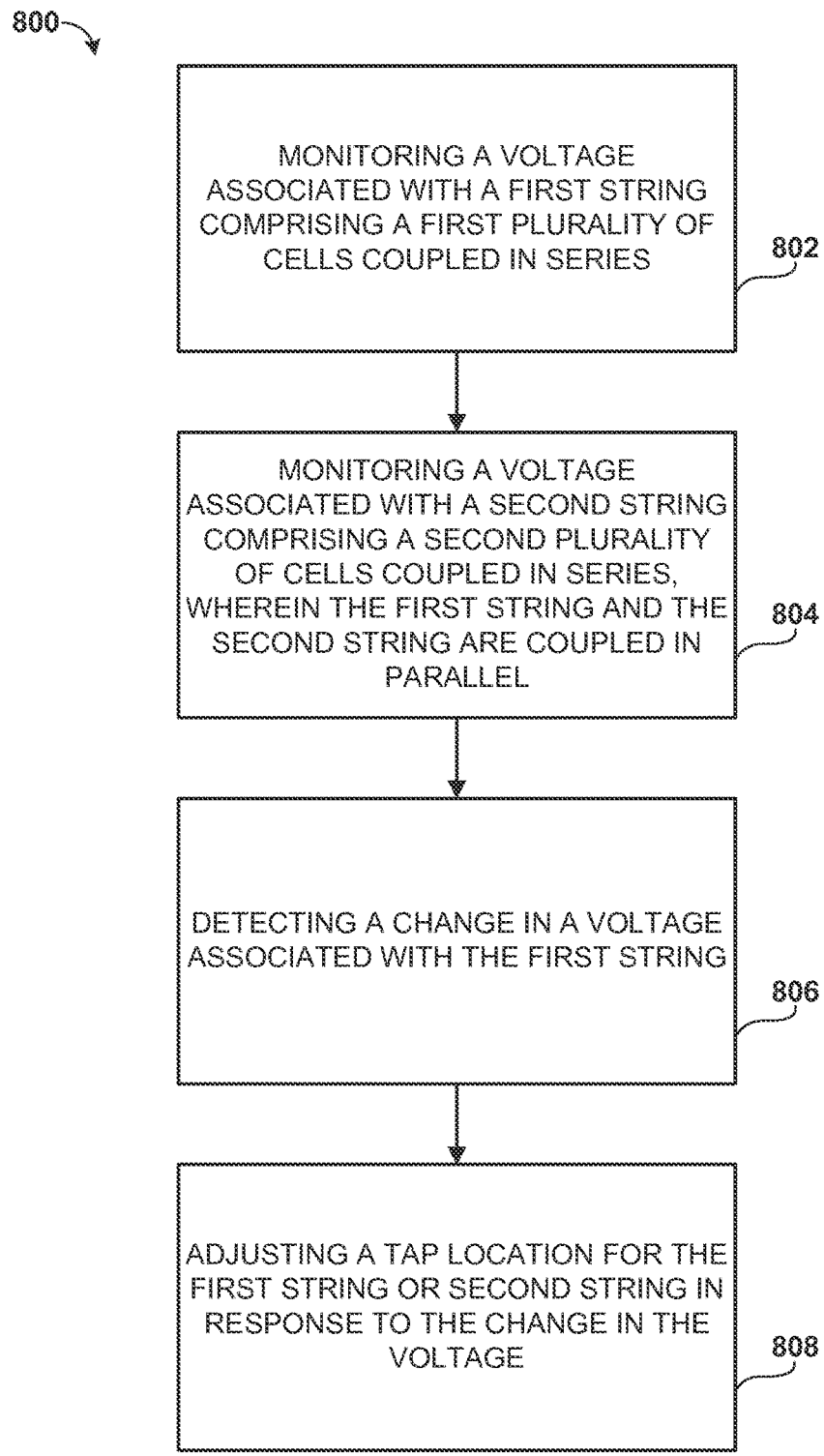
FIG. 8 depicts a flow diagram of an example method according to example embodiments of the present disclosure.

FIG. 8 depicts a flow diagram of an example method 800 for controlling a tap location associated with an energy storage unit according to example embodiments of the present disclosure. The method 800 can be implemented in any suitable energy storage unit, such as the energy storage unit 110 of FIGS. 4-7. In addition, FIG. 8 depicts steps performed in a particular order for purposes of illustration and discussion. Those of ordinary skill in the art, using the disclosures provided herein, will understand that various steps of any of the methods disclosed herein can be omitted, rearranged, modified, expanded, or adapted in various ways without deviating from the scope of the present disclosure.

At (802), the method 800 includes monitoring a voltage associated with a first string 112A comprising a first plurality of cells 113 coupled in series. At (804), the method 800 includes monitoring a voltage associated with a second string 112B comprising a second plurality of cells 114 coupled in series. The first string 112A and the second string 112B can be coupled in parallel. For instance, a control system 120 can monitor the voltage associated with the first string 112A and/or the voltage associated with the second string 112B. The voltage can be an open circuit voltage. In addition, and/or in the alternative, the control system 120 can monitor a voltage associated with one or more cells of the first and/or second plurality of cells 113, 114.

At (806), the method 800 includes detecting a change in a voltage associated with the first string 112A. For instance, the control system 120 can detect a change in the voltage associated with the first string 112A. The change in the voltage can be a voltage reduction associated with the first string 112A that can occur when a cell 113 fails (e.g., fails short).

Figure 5:
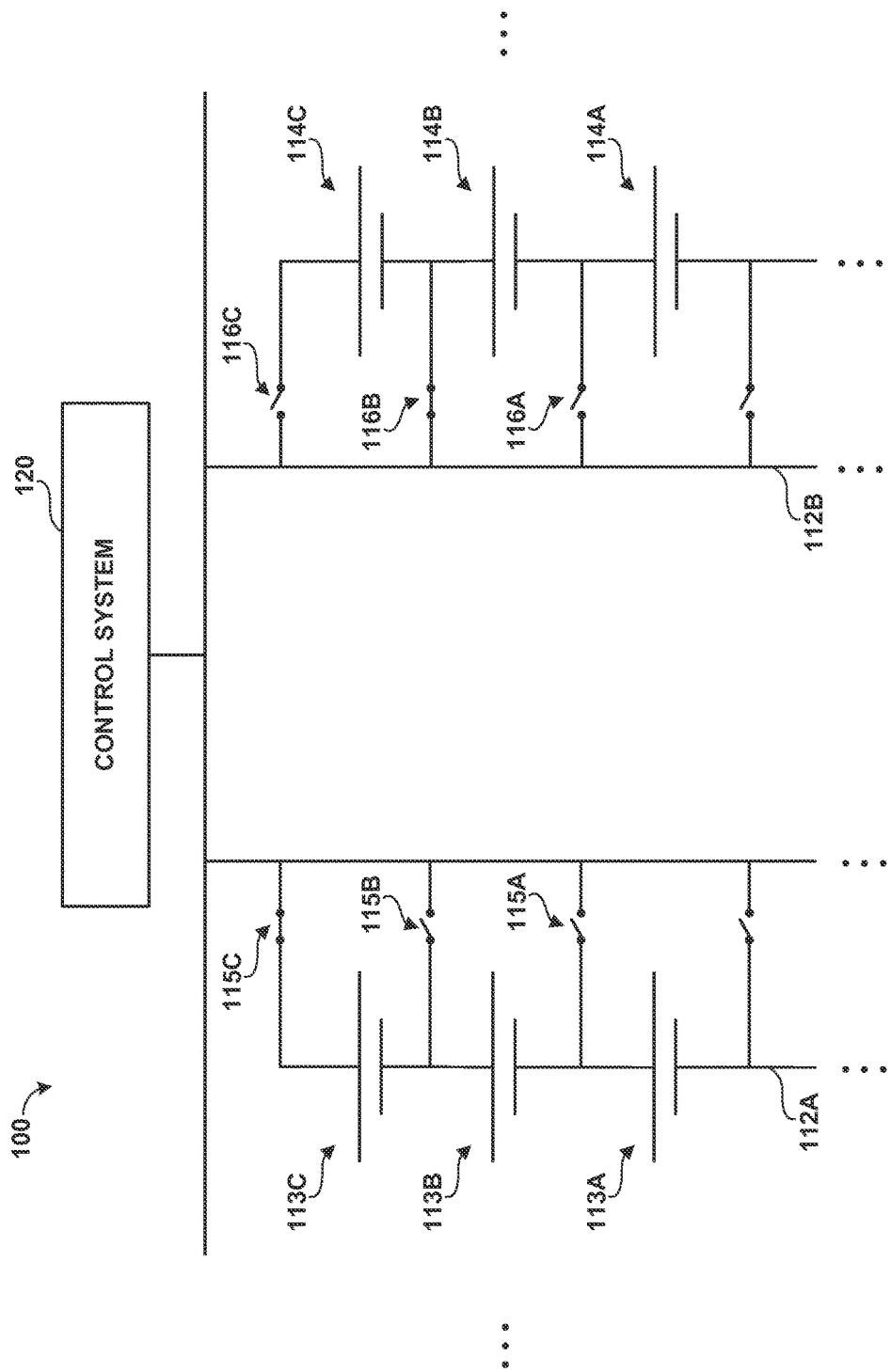
FIG. 5 depicts an energy storage unit according to example embodiments of the present disclosure.

At (808), the method 800 includes adjusting a tap location for the first string 112A or second string 112B in response to the change in the voltage. For instance, the control system 120 can adjust a tap location for the first string 112A and/or second string 112B. In one example, the method 800 can include adjusting the tap location associated with the first string 112A to increase the number of cells that provide power through the tap location associated with the first string 112A. Prior to the change in the voltage of the first string 112A, the first string 112A can be associated with a tap location at a first tap 115B that is closed, as shown in FIG. 4. When the voltage associated with the first string 112A changes (e.g., reduces), the control system 120 can adjust the tap location associated with the first string 112A by adjusting the first tap 115B from a closed position to an open position and adjusting a second tap 115C from an open position to a closed position, as shown in FIGS. 4 and 5. By adjusting the tap location to the second tap 115C, the control system 120 can allow an additional cell 113C (that was not providing power through the tap location prior to the change in voltage) to provide power through the tap location (e.g., at the closed second tap 115C). In this way, the control system 120 can increase the voltage associated with the first string 112A and balance the open circuit voltage among the plurality of strings.

Figure 6:
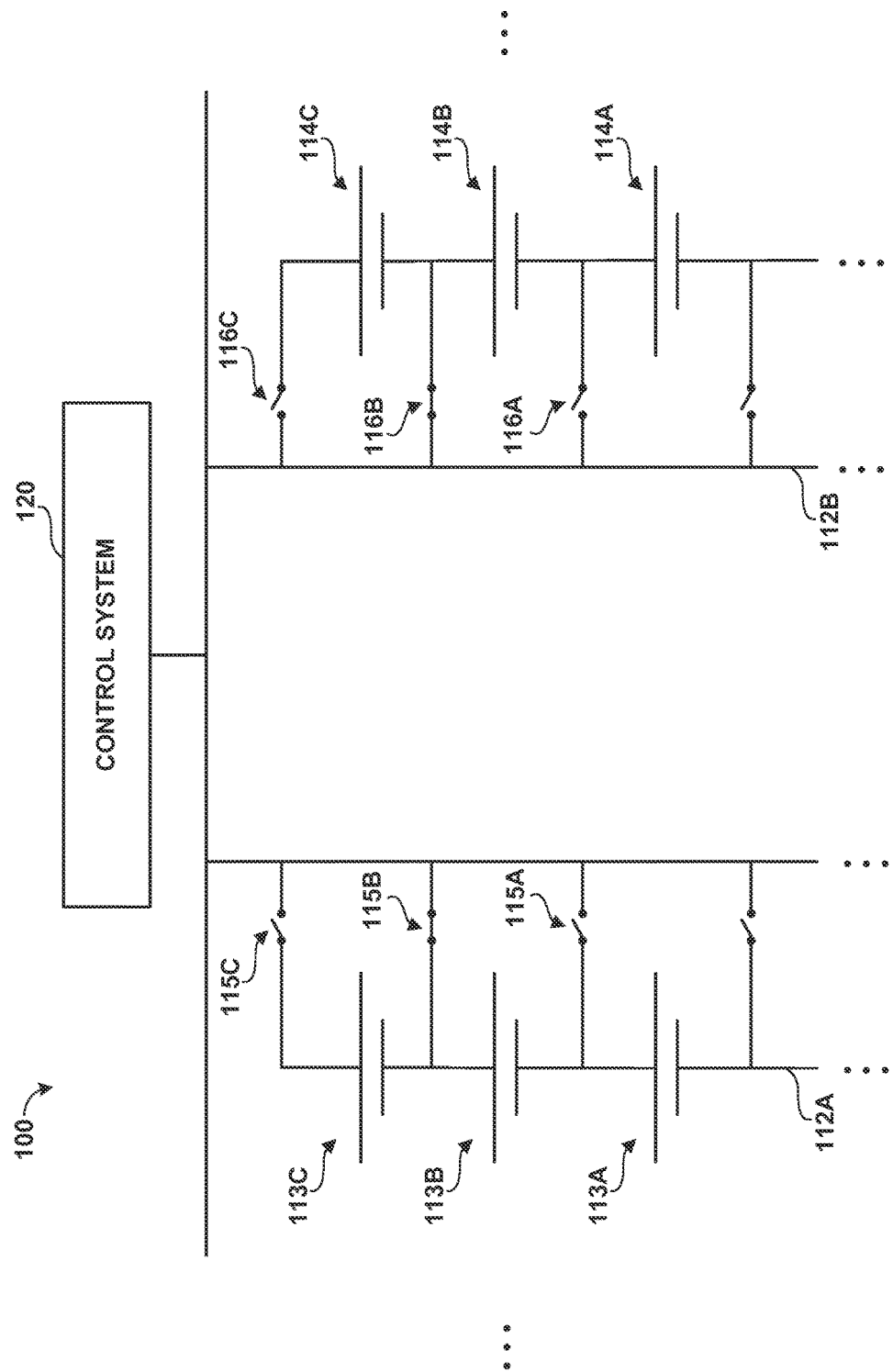
FIG. 6 depicts an energy storage unit according to example embodiments of the present disclosure.

In addition, and/or in the alternative, the method 800 can include adjusting the tap location for the second string 112B to decrease the number of cells 114 that provide power through the tap location for the second string 112B. For instance, prior to the change in the voltage associated with the first string 112A, the second string 112B can have a tap location at a first tap 116B, as shown in FIG. 6. When the voltage associated with the first string 112A changes (e.g., reduces), the control system 120 can adjust the tap location associated with the second string 112B by adjusting the first tap 116B from a closed position to an open position and adjusting a second tap 116A from an open position to a closed position, as shown in FIGS. 6 and 7. The tap location can now be associated with the closed second tap 116A and can prevent cell 114B (that was previously providing power prior to the change in voltage of first string 112A) from providing power through the tap location (e.g., at second tap 116A). In this way, the control system 120 can decrease the voltage associated with the second string 112B and balance the open circuit voltages of the first and second string(s) 112A, 112B.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage system, comprising:
   a plurality of energy storage units;
   a plurality of buses; and
   a control system configured to receive one or more signals indicative of a voltage associated with each energy storage unit of the plurality of energy storage units,
   wherein the control system is configured to send one or more command signals to selectively couple each energy storage unit to one bus of the plurality of buses based at least on the voltage associated with each energy storage unit of the plurality of energy storage units.

2. The energy storage system of claim 1, wherein the control system is configured to send one or more command signals to selectively couple each energy storage unit to one bus of the plurality of buses such that energy storage units of the plurality of energy storage units with substantially similar voltages are coupled to a same bus.

3. The energy storage system of claim 1, wherein the voltage is an open circuit voltage (OCV).

4. The energy storage system of claim 1, wherein each bus of the plurality of buses is associated with a power converter.

5. The energy storage system of claim 1, wherein the plurality of buses comprises a first bus and a second bus.

6. The energy storage system of claim 5, wherein the control system is configured to send one or more command signals to decouple a first energy storage unit of the plurality of energy storage units from the first bus and to send one or more command signals to couple the first energy storage unit to the second bus in response to a change in the voltage associated with the first energy storage unit.

7. The energy storage system of claim 6, wherein the change in the voltage is a reduction in the voltage.

8. A method of controlling an energy storage system, the energy storage system comprising a plurality of energy storage units and a plurality of buses, the method comprising:
   receiving, by one or more control devices, one or more signals indicative of a voltage associated with each energy storage unit of the plurality of energy storage units;
   detecting, by the one or more control devices, a change in the voltage of at least one energy storage unit of the plurality of energy storage units; and
   sending, by the one or more control devices, one or more command signals to selectively couple one or more energy storage units of the plurality of energy storage units among the plurality of buses such that energy storage units of the plurality of energy storage units with substantially similar voltages are coupled to a same bus.

9. The method of claim 8, wherein the sending comprises:
   sending one or more command signals to decouple the one or more energy storage units from a first bus of the plurality of buses, and
   sending one or more command signals to couple the one or more energy storage units to a second bus of the plurality of buses in response to the change in the voltage.

10. The method of claim 8, wherein the sending comprises:
    grouping each energy storage unit of the plurality of energy storage units based at least on the voltage associated with each energy storage unit such that energy storage units of the plurality of energy storage units with substantially similar voltages are included in a same group, and
    sending one or more command signals to couple the energy storage units within the same group to a same bus.

11. The method of claim 8, wherein the voltage is an open circuit voltage (OCV).

12. The method of claim 8, wherein the change in the voltage is a reduction in the voltage.

13. The method of claim 8, wherein the change in the voltage is associated with a cell failure.

14. The method of claim 8, wherein each bus of the plurality of buses is associated with a power converter of a plurality of power converters.

15. A control system for an energy storage system, the control system comprising one or more processors and one or more memory devices, the one or more memory devices storing computer-readable instructions that, when executed by the one or more processors, cause the one or more processors to perform operations, the operations comprising:
    receiving one or more signals indicative of a voltage associated with each energy storage unit of a plurality of energy storage units;
    detecting a change in the voltage of at least one energy storage unit of the plurality of energy storage units; and
    sending one or more command signals to selectively couple one or more energy storage units of the plurality of energy storage units among the plurality of buses such that energy storage units of the plurality of energy storage units with substantially similar voltages are coupled to a same bus.

16. The control system of claim 15, wherein the operation of sending comprises:

sending one or more command signals to decouple the one or more energy storage units from a first bus of the plurality of buses, and sending one or more command signals to couple the one or more energy storage units to a second bus of the plurality of buses in response to the change in the voltage associated with the one or more energy storage units.

17. The control system of claim 15, wherein the operation of sending comprises:

grouping each energy storage unit of the plurality of energy storage units based at least on the voltage associated with each energy storage unit, such that energy storage units associated with substantially similar voltages are included in a same group, and sending one or more command signals to couple the energy storage units within the same group to a same bus.

18. The control system of claim 15, wherein the voltage is an open circuit voltage (OCV).

19. The control system of claim 15, wherein the change in the voltage is a reduction in the voltage.

20. The control system of claim 15, wherein each bus of the plurality of buses is associated with a power converter of a plurality of power converters.

* * * * *